United States Patent [19]
Henke et al.

[11] Patent Number: 5,154,154
[45] Date of Patent: * Oct. 13, 1992

[54] INTAKE DEVICE FOR A MIXTURE-COMPRESSING INTERNAL-COMBUSTION ENGINE

[75] Inventors: Jürgen Henke, Wernau; Peter Früh, Weinstadt; Georg Mehne, Gschwend, all of Fed. Rep. of Germany

[73] Assignee: Mercedes-Benz Aktiengesellschaft, Fed. Rep. of Germany

[*] Notice: The portion of the term of this patent subsequent to Aug. 25, 2009 has been disclaimed.

[21] Appl. No.: 727,951

[22] Filed: Jul. 10, 1991

[30] Foreign Application Priority Data

Jul. 28, 1990 [DE] Fed. Rep. of Germany ....... 4024005

[51] Int. Cl.⁵ .............................................. F02M 31/00
[52] U.S. Cl. .................................... 123/549; 123/547
[58] Field of Search ............... 123/549, 543, 545, 547, 123/557, 552

[56] References Cited

U.S. PATENT DOCUMENTS

| | | | |
|---|---|---|---|
| 1,417,308 | 5/1922 | Ellis et al. | 123/549 |
| 1,561,815 | 11/1925 | Aske | 123/549 |
| 3,930,477 | 1/1976 | Jordan | 123/549 |
| 4,211,191 | 7/1980 | Kawamura et al. | 123/547 |
| 4,345,569 | 8/1982 | Hattori et al. | 123/549 |
| 4,458,654 | 7/1984 | Tuckey | 123/557 |
| 5,007,402 | 4/1991 | Scherenberg | 123/547 |

FOREIGN PATENT DOCUMENTS

| | | | |
|---|---|---|---|
| 0343652 | 11/1989 | European Pat. Off. | 123/549 |
| 3426469 | 5/1986 | Fed. Rep. of Germany . | |

*Primary Examiner*—E. Rollins Cross
*Assistant Examiner*—M. Macy
*Attorney, Agent, or Firm*—Evenson, Wands, Edwards, Lenahan & McKeown

[57] ABSTRACT

An intake device for a mixture-compressing internal-combustion engine has a heating element for heating the injected fuel downstream of an injection nozzle in the intake channel in order to avoid formation of fuel condensate which is harmful in the exhaust emission. The heating elements are configured in plate form and directed at an angle towards the injected fuel jet such that, on one hand, there is a good heating and, on the other hand, there is a low flow resistance by the heating elements. The plate heating element can be integrated in a flush and heat-insulating manner in the wall of the intake channel. By virtue of the low flow resistance which a plate-like heating element arranged obliquely in the fuel/air mixture flow produces, the heating surface can be made larged and consequently a rapid fuel heating can be achieved.

9 Claims, 3 Drawing Sheets

5,154,154

INTAKE DEVICE FOR A MIXTURE-COMPRESSING INTERNAL-COMBUSTION ENGINE

BACKGROUND AND SUMMARY OF THE INVENTION

The present invention relates to an intake device for a mixture-compressing internal-combustion engine and, more particularly, to the type of intake device which uses an electric heating element fitted in the intake channel downstream of an injection nozzle and comprises a sheet-like heating body essentially flowed around by the combustion air and a base part via which the heating body is held in an essentially heat-insulated manner on the cylinder head. The surface of the heating body facing the injection nozzle is impinged at least by part of the quantity of fuel discharged by the injection nozzle, and a connection for the heating body to a power source is provided in the base part.

An intake device is shown in DE-C 34 26 469 in which an annular heating element is provided close to the engine valve opening, into which element the fuel is injected obliquely. The heating ring lays with its longitudinal axis essentially in the direction of flow. It is disadvantageous in the case of such a heating ring that the fuel jet had to be introduced obliquely through one of the open end faces of the heating ring into the ring. Since the fuel jet fans out when it leaves the injection nozzle, the heating ring must either be arranged relatively close to the injection nozzle, or the fanning-out fuel jet to a great extent impinges on the closed annular end face of the hearing ring and its outer casing. As a result, an undesired swirling of the injected fuel jet occurs at the hearing ring element. The latter case occurs in particular whenever the heating ring is fitted in the desired way as close as possible to the engine valve opening and the injection nozzle can only be provided some distance away from the heating ring. Such distances are often inevitable due to installation conditions.

Moreover, an intake device which coincides in its construction substantially with that of the known intake device, and also has the disadvantage of the latter, is shown in EP-A 0 343 652.

It is an object of the present invention to provide an improvement in intake devices and, in particular, to avoid formation of fuel condensate which is harmful in exhaust emissions.

This object is achieved in accordance with the present invention by configuring the heating plate in a flat form which is held on a base part by a narrow support which is transverse to the direction of combustion air flow. The fuel-impinged surface of the plate runs parallel or at angle with respect to the longitudinal axis of the intake channel.

According to the present invention, the heating plate is impinged obliquely by the fuel jet directed at the engine valve opening. As a result, the heating element forms only an extremely low flow resistance and thus excessive uncontrolled swirling effects in the region of the hearing element are avoided.

In the case of one embodiment of the present invention in which the heating plate is integrated in the wall of the intake line, the flow resistance brought about by such a heating element is minimized to the greatest extent. Since the fuel jet is to have as little contact as possible with the walls of the intake line on its way into the valve opening, however, a heating element integrated into the intake line wall cannot be arranged in the main flow axis of the fuel jet. Rather, it is necessary in this embodiment to divide the fuel jet into a main jet and a secondary jet, with the secondary jet being substantially smaller with respect to its rate of flow than the main jet. The secondary jet is produced by an additional opening in the injection nozzle. The secondary jet is directed to impinge directly on the hearing element laying flush in the line wall and is reflected back from there into the main stream.

Although the present invention does produce a somewhat greater resistance due to the free arrangement within the inlet channel, it has the advantage that a good fuel heating with a simultaneous good air preheating can take place due to the heating element plate being flowed around on virtually all sides. Moreover, the heating plate protruding freely into the intake channel can be directed into the injection jet at an acute angle in such a way that a dividing of the injection jet into a main jet and a smaller secondary jet is unnecessary.

BRIEF DESCRIPTION OF THE DRAWINGS

These and further objects, features and advantages of the present invention will become more readily apparent from the following detailed description of presently preferred embodiments when taken in conjunction with the accompanying drawings wherein.

DETAILED DESCRIPTION OF THE DRAWINGS

Figure 1:
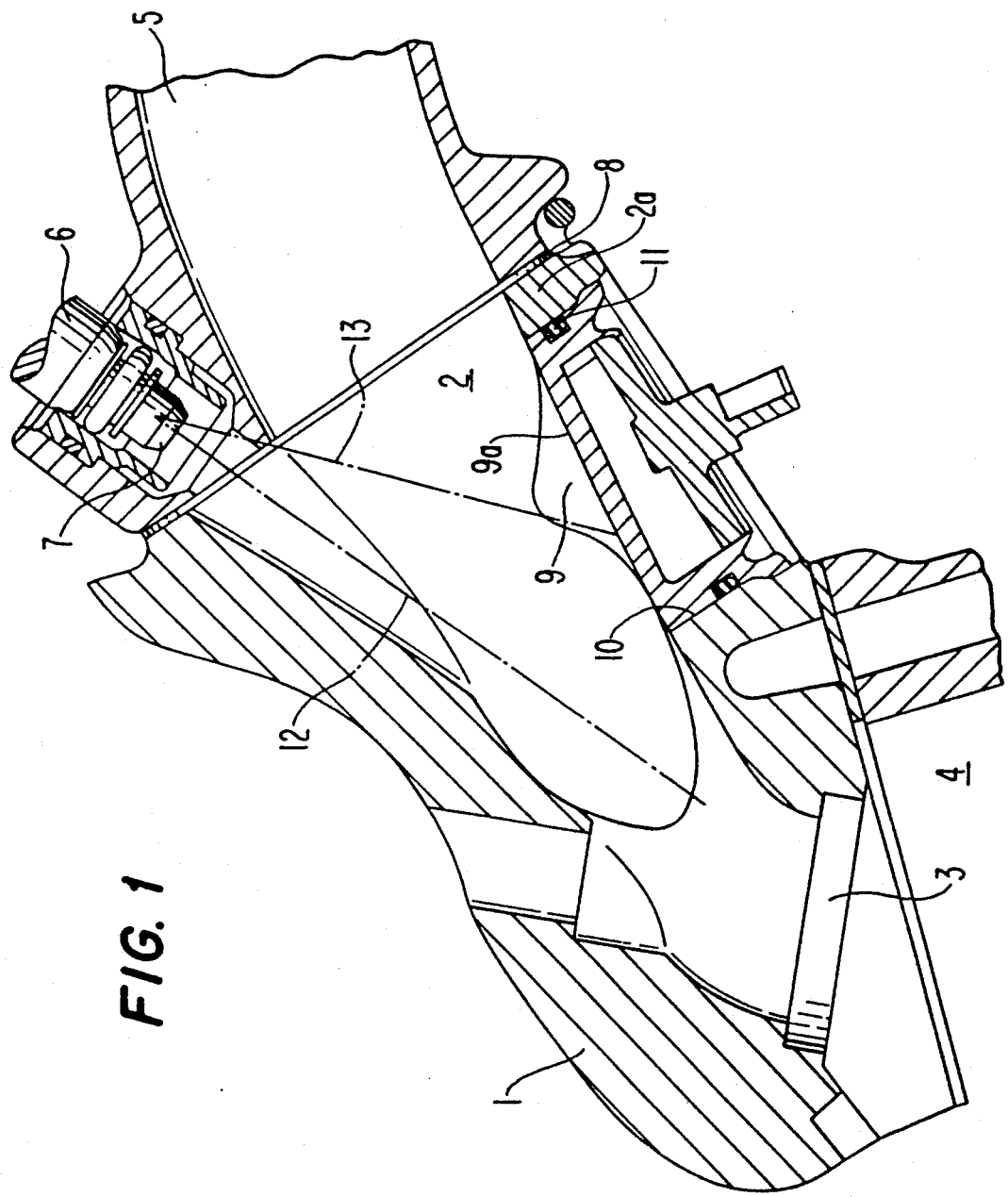
FIG. 1 is a sectional view through the intake channel of a internal combustion engine cylinder head with heating element integrated flush in the intake channel wall in accordance with one embodiment of the present invention.

The intake device shown in FIG. 1 comprises an intake channel 2 provided in a cylinder head 1 of an internal-combustion engine (a portion of which is shown) and an intake pipeline 5, adjoining the intake channel 2. The channel 2 opens out via valve openings 3 into one of the engine cylinders 4. In the intake pipeline 5, an injection nozzle 6 is inclined in the direction of flow of the combustion air. The nozzle tip 7 of the nozzle 6 opens out into the intake pipe channel 2 approximately in the region of the flange plane 8 between the cylinder head 1 and the intake pipeline 5.

Fuel is injected via the injection nozzle 6 in a metered manner into the combustion air. In order to achieve a good mixture composition of fuel and combustion air in the intake pipe in the case of a cold start and in the warming-up phase of the internal-combustion engine, a heating plate 9 is fitted in the intake channel 2 flush into the channel inner wall. The heating plate 9 has positive thermal coefficient (PTC) element which is pushed into an opening 10 of the channel wall 2a. For reasons of simple manufacture, the opening 10 is made circular and the heating plate 9 cylindrical. The entering and sealing of the heating plate 9 in the opening is performed by a heat-insulating radial seal 11. The PTC element is able to be electrically heated within a short time to temperatures of up to 180° C.

Fuel is injected through the injection nozzle 6 in a main jet 12 and a secondary jet 13 into the intake channel 2 in the direction of the valve openings 3. About one-third of the fuel is introduced by the secondary jet 13, whereas the main portion is introduced by the main jet 12. The fuel jet introduced by the secondary jet 13 is directed at an angle of about 45 angular degrees directly onto the heating plate 9, at which this one-third proportion of fuel can heat up when the heating plate 9 is switched on. The heating of this proportion is sufficient to avoid a formation of fuel condensate if, by virtue of an appropriately chosen size of the heating plate 9 and of the heating power applied, the impinging full-stream portion can actually be vaporized to the greatest extent. The advantage of this embodiment is that a relatively large heating surface can be used with a negligible flow resistance. Furthermore, it is possible to arrange the heating surface very close to the valve opening. Also from a constructional viewpoint, it involves an arrangement which is simple to produce, since the heating plate 9 in a cylindrical circular shape can be introduced into a correspondingly drilled opening.

Figure 2:
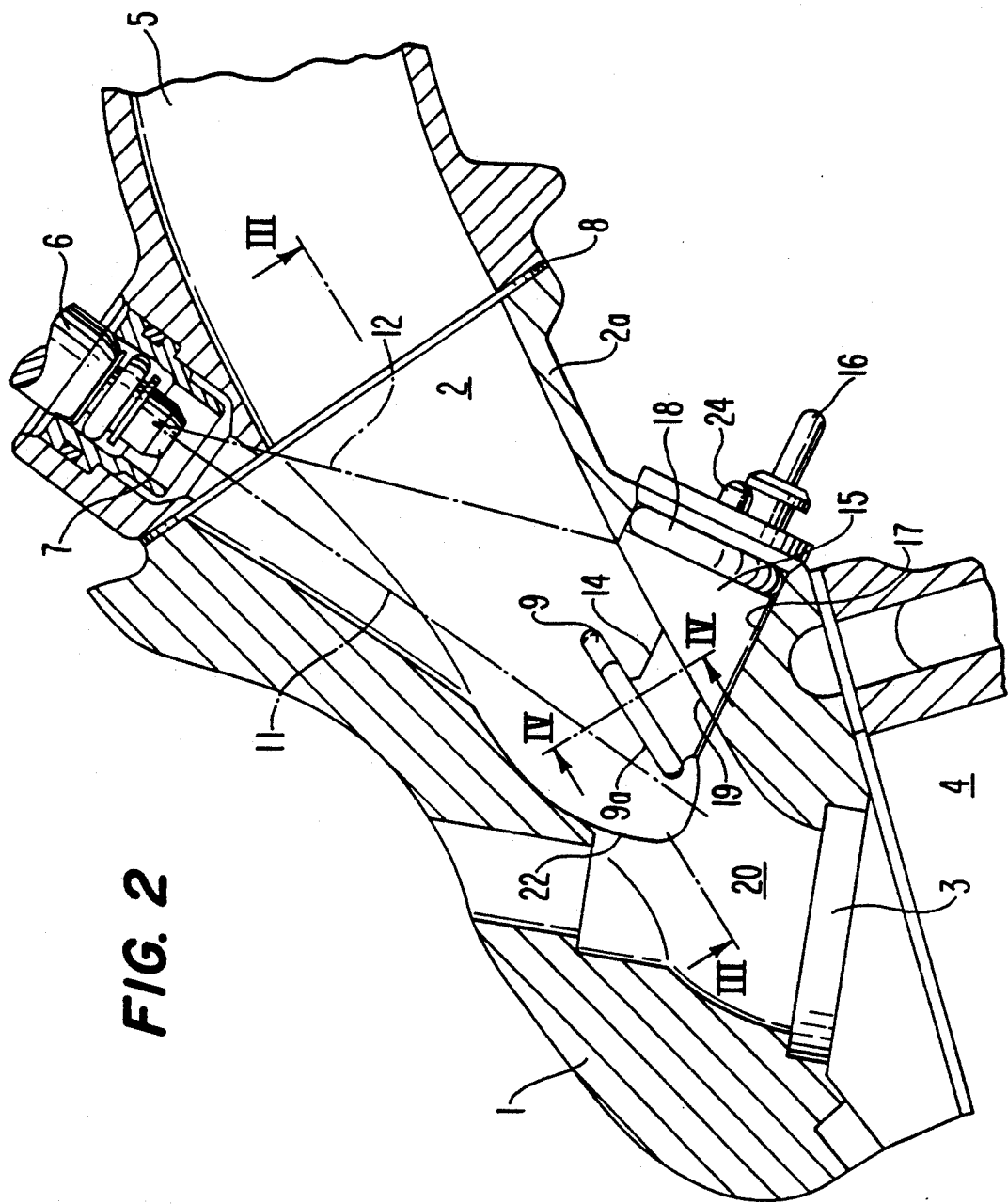
FIG. 2 is a sectional view through the intake channel of a cylinder head with a heating plate protruding into the intake channel in accordance with another embodiment of the present invention.

The intake device according to the embodiment of FIG. 2 (wherein like numerals are used to designate similar parts described with respect to FIG. 1 and therefore not again described) differs in principle from that according to FIG. 1 only in that, in the case of the configuration according to FIG. 2, the heating plate 9 protrudes into the intake channel 2. The essentially flat, unsupported surface 9a of the heating plate 9, on which the fuel jet coming from the injection nozzle 6 impinges, runs essentially parallel to the longitudinal axis of the intake channel 2. The surface 9a of the heating plate 9 can be varied in its angle with respect to the longitudinal axis of the intake channel 2 or the axis of the fuel jet. What is important, however, is that there is an impingement of the fuel jet on the surface 9a at an approximately acute angle. In contrast to the embodiment of FIG. 1, only one fuel jet 11 is expelled from the injection nozzle 6 and the jet passes over and by the heating plate 9, mixed with the combustion air, into the valve opening 3 of the internal combustion engine.

In the embodiment of FIG. 2, the heating plate 9 is supported on a cylindrical base part 15 by a narrow support 14 which is transverse to the direction of flow of the combustion air. Plug-in contacts 16 for a PTC heating element in the heating plate 9 are also provided on the base part 15 which is simply pushed into a cylindrical opening 17 in a channel wall 2a and sealed in terms of heat and gas within the cylinder head by a sealing ring 18. The opening 17 is arranged on an underside of the channel wall 2a. An end face 19 of the base part 15 lies flush with the intake channel wall surface of the intake channel 2.

Figure 3:
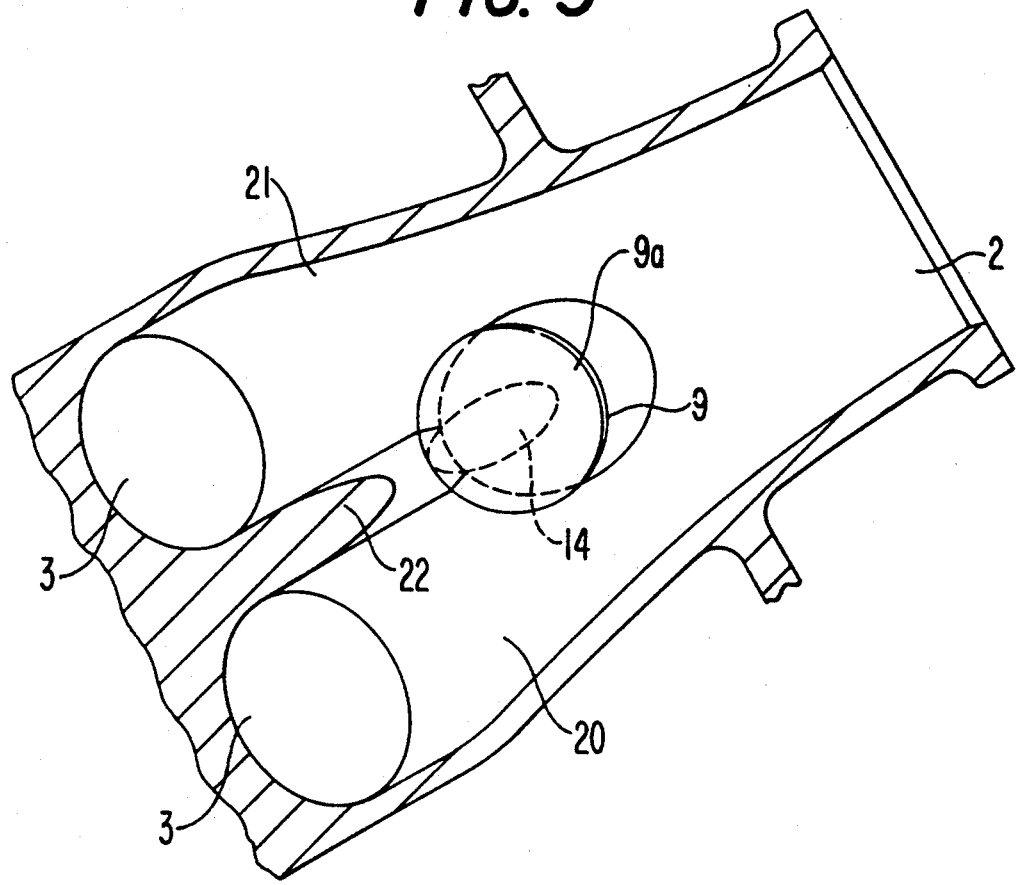
FIG. 3 is a sectional view through the intake channel along line III—III in FIG. 2.
Figure 4:
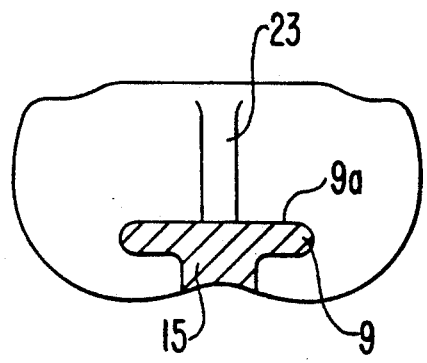
FIG. 4 shows a sectional view through a subregion of the intake channel along line IV—IV in FIG. 2.

In a four-valve engine, the intake channel 2 divides ahead of the valve opening 3 into two separate individual intake channels 20, 21 as shown in FIG. 3. In such case, the heating plate 9 is arranged directly upstream of a partition wall 22 between the individual intake channels 20, 21. In this way, the support 14 of the heating plate 9 serves as a virtual extension of the partition wall 22.

On the surface 9a of the heating plate 9, a rib 23 can be provided perpendicularly to the plate surface as an extension of the partition wall 22. In order to achieve a further-improved heat transfer from the heating element of the heating plate 9 to the fuel/combustion air mixture, the surface 9a of the heating plate 9 may be provided with variously shaped ribs or spines of material of good thermal conduction. In the case of the embodiment according to FIG. 2, the heating plate 9 lies extremely favorably with respect to flow, completely in the fanned-out fuel jet together with the intake air mixing with the fuel in the intake channel 2.

The fixing of the base parts 15 can be performed by holders which take two base parts 15 each and are fastened on the cylinder head. These holders engage fixing pins 24 of the base parts 15 and ensure a dimensionally appropriate rotational fixing of the base parts 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An intake device for a mixture-compressing internal-combustion engine, comprising a heating device inserted in an intake channel downstream of an injection nozzle, said heating device being configured as a plane heating body and a base part around which combustion air essentially flows, the heating body and the base part being arranged so as to be introducible as a single part through an opening in the channel wall and inside which the heating body, by way of the base part, is held on the cylinder head in a substantially heat-insulated manner, a surface of the heating body pointing to the injection nozzle being acted upon at least by a portion of the fuel quantity discharged by the injection nozzle, and a connection for the heating body to a power source being provided on the base part, wherein the heating body is configured as a flat heating plate held on the base part by a support having a narrow cross-section transverse to a flow direction of the combustion air, the surface of the heating body acted upon by at least a portion of the fuel quantity extends one of in parallel and at an angle with respect to a longitudinal axis of the intake channel, the opening in the channel is arranged on an underside of a wall of the channel, and the base part has a front face directed to the intake channel and closes off flush with a surface of the intake channel wall.

2. The intake device according to claim 1, wherein the base part is fitted in a sealed manner in the opening via a circumferentially arranged sealing ring.

3. The intake device according to claim 2, wherein the base part has an end face running substantially flush with a wall surface of the intake channel.

4. An intake device for a mixture-compressing internal-combustion engine, comprising an intake channel, a heater body operatively arranged with respect to the intake channel downstream of the injection nozzle so as to be a sheet-like body essentially flowed around by combustion air, a base part for holding the heating body in a substantially heat-insulated manner on a cylinder head such that a surface of the heating body facing the injection nozzle is impinged at least by part of the quantity of fuel discharged by the injection nozzle, and means associated with the base part for connecting the heating body to a power source, the heating body being a flat heating plate, a support holding the flat heating plate on the base part, which support is of narrow cross-section and is arranged transverse to the direction of flow of the combustion air to define a T-shape, and a fuel-impinged surface of the heating body is arranged to be one of parallel or at an angle with respect to a longitudinal axis of the intake channel, wherein in the case of an intake channel divided at the downstream end into two individual intake channels by a partition wall, the heating plate is provided as an extension of the partition wall at a tangent to the two individual intake channels.

5. The intake device according to claim 4, wherein the support forms an extension of the partition wall.

6. The intake device according to claim 5, wherein the support forms an extension of the partition wall.

7. The intake device according to claim 6, wherein the heating plate is arranged directly upstream of the partition wall.

8. The intake device according to claim 7, wherein at least one rib running in the direction of flow of the combustion air projects from the fuel-impinged surface of the heating plate.

9. An intake device for a mixture-compressing internal-combustion engine, comprising an intake channel, a heater body operatively arranged with respect to the intake channel downstream of the injection nozzle so as to be a sheet-like body essentially flowed around by combustion air, a base part for holding the heating body in a substantially heat-insulated manner on a cylinder head such that a surface of the heating body facing the injection nozzle is impinged at least by part of the quantity of fuel discharged by the injection nozzle, and means associated with the base part for connecting the heating body to a power source, the heating body being a flat heating plate, a support holding the flat heating plate on the base part, which support is of narrow cross-section and is arranged transverse to the direction of flow of the combustion air, and a fuel-impinged surface of the heating body is arranged to be one of parallel or at an angle with respect to a longitudinal axis of the intake channel, wherein means is provided for fitting the heating plate in a heat-insulated manner flush into the wall of the intake channel.

* * * * *